Jan. 4, 1966 J. GRAVES ET AL 3,227,260

BELT CONVEYOR APPARATUS

Filed July 31, 1963

INVENTORS
JEWEL GRAVES
WILLIS VORAN

BY Price & Heneveld

ATTORNEYS 3,227,260
BELT CONVEYOR APPARATUS
Jewel Graves, Holland, and Willis Voran, Zeeland, Mich., assignors to Big Dutchman Inc., a corporation of Michigan
Filed July 31, 1963, Ser. No. 298,989
7 Claims. (Cl. 198—25)

This invention relates to conveying equipment, and more particularly to egg conveying and transferring mechanism between overlapping conveyor belts.

Automated poultry farming today usually involves mechanized egg removal. The eggs ordinarily are allowed to roll from the individual nests onto powered conveyor belts. Often a series of parallel belts carry eggs simultaneously from adjacent rows of nests, to one end or a center portion of the poultry house. The eggs are there transferred to a common belt running transversely to the nest belts, and associated with a collection table. To provide optimum egg transfer between each of the nest belts and the transverse common belt, the belts are preferably placed in overlapping relationship, one above the other. Since the eggs must move from each nest belt to the common belt, the common belt must necessarily be slightly above and overlapping with respect to the nest belt. The slight height differential between the belts at the edge of the common belt creates a definite step over which the eggs being transferred must pass. Often eggs bumping against the edge of the top belt do not move over the step, but rather stop and spin on the lower belt. This causes following eggs to gather at this position, thereby completely blocking the conveyor. This situation presents a potential for broken eggs with a resulting mess in the conveyor mechanism. It also requires a workman to go to the belt juncture and manually start the eggs moving again. If no one happens to be present when the situation arises, substantial loss and difficulties can occur.

Further, when the eggs move from one belt to another, they must ordinarily change directions abruptly. It is therefore an object of this invention to provide a conveyor system and mechanism assuring smooth, constant transfer of eggs from one moving belt to another overlapping moving belt transverse of the first belt, and preventing any of the eggs from remaining at the step between the belts.

It is another object of this invention to provide an egg conveying mechanism and transfer mechanism between belt conveyors, that gently and continuously boosts the eggs from one belt to the other overlapping belt without any damage to the eggs.

It is another object of this invention to provide an egg transfer mechanism for conveyors, capable of continuous pushing of eggs from one conveyor belt to another without requiring any supplemental power supply or motor means, that is operable directly by the belt, that operates continuously while the conveyor is operating, and starts and stops with the conveyor.

It is another object of this invention to provide an egg boosting transfer mechanism between overlapping conveyor belts, that gently and gradually changes the direction of movement of the eggs from the direction of movement of one belt to the direction of movement of the other belt, without any sudden abrupt changes to cause damage to the eggs.

These and other objects of this invention will become apparent upon studying the following specification in conjunction with the drawings in which.

Figure 1:
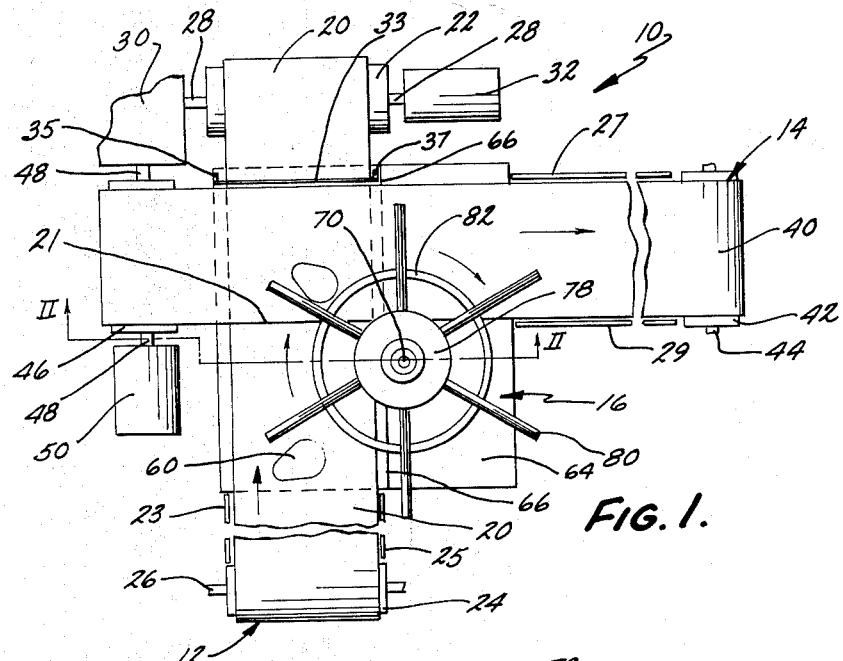
FIG. 1 is a plan view of overlapping belt conveyors employing the novel egg transfer mechanism.

Basically, the invention pertains to transversely positioned conveyor belts, and egg transfer mechanism adjacent the overlapping intersection of the belts. The transfer mechanism includes a wheel having a rotatably mounted hub, a plurality of spokes radiating from the hub and overlying the conveyor belt to boost eggs from one to the other, and an annular frictional drive means on the wheel in the form of a ring attached to the bottom of the spokes intermediate the ends thereof and engaging the upper belt to be frictionally driven thereby, to rotate the wheel with its spokes.

Referring now specifically to the drawings, the conveyor mechanism 10 includes a first belt conveyor 12, a second belt conveyor 14, and an egg transfer mechanism 16 at the intersection of the transversely positioned conveyors.

The first conveyor 12, when forming the part of an egg conveying system in a poultry house, comprises the nest conveyor running adjacent the individual nests in a row (not shown) to receive the eggs rolling out of the nests and transfer them to a common belt at one end or a central portion of the poultry house. The conveyor conventionally includes a continuous flexible belt 20 driven by a first hub or roller 22 and moving around an idler hub or roller 24. Hub 24 is mounted on suitable axle means 26. Hub 22 is also mounted on axle means 28 supported by suitable fixed support means 30 for bearing movement with respect thereto. This roller 22 is operably driven by mounted motor means 32 such as an electrical motor. Suitable gearing or chain mechanism may be operably engaged between motor 32 and roller 22 to achieve the desired belt speed.

The second conveyor 14 positioned transversely of the first conveyor 12 and intersecting therewith also includes an endless conveyor belt 40 adapted to move around idler roller 42 suitably mounted with axle means 44, and around driven roller 46 mounted on axle means 48, one end of which is secured to support means 30 and the other end of which is driven by motor means 50 such as an electrical motor.

Conveyor 14, moves transversely of the first conveyor, normally at a right angle thereto. With conveyor 12 moving in the direction indicated by the arrow in FIG. 1, and conveyor 14 moving in the direction indicated by the arrow of FIG. 1, it is necessary that the upper portion of conveyor belt 40 overlap the upper portion of conveyor belt 20 so that eggs 60 on the upper surface of belt 20 can move to the upper surface of belt 40.

Figure 2:
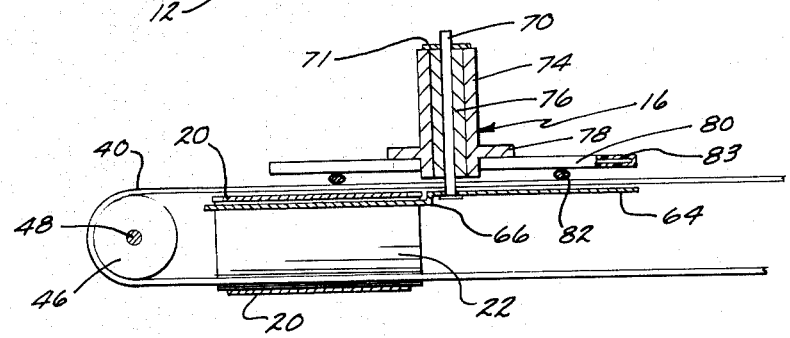
FIG. 2 is a sectional view taken on plane II—II of the apparatus in FIG. 1.
Figure 3:
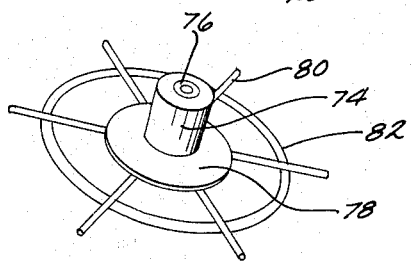
FIG. 3 is a perspective view of the egg transfer wheel illustrated in FIGS. 1 and 2.

Serving as a general bearing support and guide for the two belts at the intersection thereof is a rectangular metallic plate 64 extending under the entire intersection. The plate includes a step down 66 in its central portion, and extending lengthwise, parallel to belt 20 to position and guide the lower belt 20 on its lower surface portion (on the left side in FIGS. 1 and 2), and to position the upper belt 40 upon its upper portion (on the right side in FIGS. 1 and 2). This spaces the belts as closely together as possible without excessive friction between them.

A special vertical bearing shaft 70 is secured at its lower end to this panel 64 adjacent the corner at the intersection of the two belts. Securement may be by weldment, press-fit, or other equivalents. It extends vertically to rotatably mount transfer wheels 16. This transfer wheel includes a vertically elongated hub 74 having an annular central bearing 76 forming a shaft-receiving opening to fit over shaft 70. The hub is retained in the shaft by using, for example, a snap ring 71. The upper end of shaft 70 may also be supported by a separate brace (not shown). This hub includes a radially extending, horizontal annular disc portion 78 near its lower end for attachment as by welding of a plurality of radiating spokes 80. These spokes are of sufficient length to extend a substantial distance over conveyor belts 20 and 40 at the intersection thereof.

Secured by weldment to the bottom of these spokes, intermediate the ends thereof, is an annular ring 82 serving as a frictional drive means for the wheel. It also forms a guide surface for eggs. This ring is positioned substantially radially outwardly on the spokes to overlap a portion of upper belt 40. Yet the spokes extend substantially beyond this ring to provide sufficient egg contacting surface for pushing the eggs from belt 20 up over the step at edge 21 of belt 40, onto belt 40.

The weight of wheel 16 is rested upon the surface of belt 40 by the contact of ring 82 with the belt. Movement of belt 40 in the direction illustrated by the arrow causes frictional contact on ring 82, forcing the wheel to rotate about shaft 70. The spokes of the wheels thus gently push the eggs from belt 20, over the jump 21, onto belt 40. The wheel prevents any abrupt changes in direction of the eggs by gently and gradually making the directional change through an arcuate path over the 90° angle change.

Along the extent of conveyor 12 is a pair of side rails 23 and 25 extending above belt 20 to retain eggs on the belt. Likewise along conveyor 14 is a pair of side rails 27 and 29 to retain the eggs on belt 40. To prevent any accidental movement of an egg off belt 40 once it has been received, and back onto belt 20 on the far side of the assembly, a vertically extending guard panel 33 is mounted parallel with the far edge of belt 40 adjacent the position where belt 20 emerges from under belt 40. This guard panel 33 may be secured, for example, to support panel 64 by suitable tabs 35 and 37.

Since the transfer unit operates directly from the belt itself, it requires no supplemental power means or motor means to rotate it. Further, it moves continuously and automatically once the conveyor is started, and stops and starts automatically with the conveyor.

Preferably, the spokes and the ring are coated with a resilient plastic material 83 (FIG. 2) such as a vinyl plastic, e.g. polyvinyl-chloride, or any equivalent, for two purposes. The ring when so coated forms an excellent drive relationship with the belt. The spokes form softer contacting surfaces with the eggs to prevent any accidental breakage.

It will be obvious to those having ordinary skill in the art that the device has particular advantages and uniqueness applied to the transfer of eggs from one conveyor belt to another. Within the broader aspects of the principles involved, it is conceivable that the structure may also be applied to other similar type articles. Also, it is conceivable that various minor modificaions may be made in the structure illustrated to suit a particular purpose, location or conveyor structure, while still employing the novel concepts herein taught. Thus, obvious modifications of the described structure are deemed to be part of this invention concept, and the invention is not to be limited to the form illustrated, but only by the scope of the appended claims and the reasonably equivalent structures to those defined therein.

We claim:

1. Conveyor and transfer mechanism comprising: a pair of intersecting conveyors, each having a continuously moving article conveying surface; rotational article transfer assisting means adjacent the intersection of said conveyors, including radial portions positioned above said surfaces for pushing articles from one surface to the other, and a portion continuously engaging one of said moving conveyor surfaces for rotationally driving said article transfer assisting means.

2. An egg conveyor mechanism comprising: first and second belt conveyors positioned at any angle with respect to each other to transfer eggs from said first conveyor to said second conveyor, one belt being above the other egg transfer means mounted at the intersection of said conveyors; said transfer means including a wheel having a hub rotatably mounted, and a plurality of radial spokes extending over said conveyors to push eggs from said first conveyor to the second when said spokes are rotated with said hub; and frictional drive means between said wheel and the uppermost belt to continuously rotate said spokes with movement of said uppermost belt.

3. An egg conveyor mechanism comprising; first and second belt conveyors positioned at any angle with respect to each other to transfer eggs from said first conveyor to said second conveyor, one belt being above the other; egg transfer means mounted at the juncture of said conveyors; said transfer means including a wheel having a hub rotatably mounted, and a plurality of radial spokes extending over said conveyors to push eggs from said first conveyor to the second when said spokes are rotated with said hub; and a frictional drive ring attached to said wheel intermediate the ends of said spokes, and in contact with the uppermost belt to continuously rotate said wheel and spokes with movement of the uppermost belt.

4. The mechanism in claim 3 wherein said ring is secured to the bottoms of said spokes.

5. An egg transfer mechanism for mounting adjacent intersecting, overlapping powered conveyor belts at an angle to each other comprising: a rotatably mounted wheel; a plurality of radially-extending, spaced egg-pushing spokes on said wheel; said spokes adapted to extend over said belts to pass sequentially over the belts to transfer eggs therebetween; and said wheel having an annular friction drive element spaced radially inwardly a substantial distance from the outer ends of said spokes, and adapted to contact the uppermost of said belts to be frictionally rotated thereby.

6. An egg transfer wheel for mounting between adjacent overlapping powered conveyor belts to transfer eggs from the lower belt to the upper belt comprising: a wheel having a bearing hub; a plurality of radial spokes from said hub to serve as pusher elements; and a frictional drive ring attached beneath said spokes and adapted to ride upon and be driven by the upper belt to push eggs from the lower belt to the upper belt by said spokes.

7. The wheel in claim 6 wherein the surfaces of said spokes and ring comprise a resilient plastic providing optimum driving characteristics to said ring, and optimum egg contact characteristics to said spokes.

References Cited by the Examiner

UNITED STATES PATENTS

| | | | |
|---|---|---|---|
| 1,274,562 | 8/1918 | Hull | 198—25 X |
| 1,588,903 | 6/1926 | Parker | 198—25 X |
| 2,115,255 | 4/1938 | David | 198—25 |
| 2,303,755 | 12/1942 | Newton | 198—25 |

SAMUEL F. COLEMAN, *Primary Examiner.*

EDWARD A. SROKA, *Examiner.*